United States Patent
Takahashi et al.

(10) Patent No.: US 12,301,074 B2
(45) Date of Patent: May 13, 2025

(54) CONDUCTIVE WIRE, WELDING METHOD, AND METHOD FOR MANUFACTURING ROTATING ELECTRICAL MACHINE

(71) Applicants: Proterial, Ltd., Tokyo (JP); Hitachi Astemo, Ltd., Ibaraki (JP)

(72) Inventors: Noriyuki Takahashi, Tokyo (JP); Teruaki Nakashima, Ibaraki (JP)

(73) Assignees: Proterial, Ltd., Tokyo (JP); Hitachi Astemo, Ltd., Ibaraki (JP)

( * ) Notice: Subject to any disclaimer, the term of this patent is extended or adjusted under 35 U.S.C. 154(b) by 462 days.

(21) Appl. No.: 17/704,338

(22) Filed: Mar. 25, 2022

(65) Prior Publication Data

US 2022/0320976 A1  Oct. 6, 2022

(30) Foreign Application Priority Data

Apr. 2, 2021 (JP) .................................. 2021-063764

(51) Int. Cl.
*H02K 15/00* (2006.01)
*H02K 3/28* (2006.01)
*H02K 3/50* (2006.01)

(52) U.S. Cl.
CPC ........... *H02K 15/0068* (2013.01); *H02K 3/28* (2013.01); *H02K 3/50* (2013.01)

(58) Field of Classification Search
CPC ........ H02K 15/0068; H02K 3/28; H02K 3/50; H02K 15/0081

See application file for complete search history.

(56) References Cited

U.S. PATENT DOCUMENTS

| | | | | |
|---|---|---|---|---|
| 6,118,191 A * | 9/2000 | Ichikawa | ............... | B23K 9/167 29/598 |
| 6,181,043 B1 * | 1/2001 | Kusase | .................... | H02K 3/50 310/201 |
| 6,403,921 B1 * | 6/2002 | Maeda | ............... | H02K 15/0081 29/598 |
| 6,459,177 B1 * | 10/2002 | Nakamura | ......... | H02K 15/0056 310/201 |
| 10,003,232 B2 * | 6/2018 | Goto | .................. | H02K 15/0414 |

(Continued)

FOREIGN PATENT DOCUMENTS

| | | |
|---|---|---|
| JP | H09-215280 A | 8/1997 |
| JP | 2017-079528 A | 4/2017 |
| WO | 2013/042248 A1 | 3/2013 |

OTHER PUBLICATIONS

Farson et.al Arc initiation in gas metal arc welding, Welding Research, 1998 (Year: 1998).*

(Continued)

*Primary Examiner* — Jeffrey T Carley
*Assistant Examiner* — Jose K Abraham
(74) *Attorney, Agent, or Firm* — Studebaker Brackett PLLC (57) ABSTRACT

A conductive wire includes an angled protrusion having a tapered shape being integrated with a wire-shaped main body and configured to generate an arc between itself and an arc welding electrode. At least one of the pair of conductive members comprises an angled protrusion having a tapered shape. Welding of the conductive members is performed by melting the angled protrusion by generating an arc between the angled protrusion and an electrode.

9 Claims, 11 Drawing Sheets

(56) References Cited

U.S. PATENT DOCUMENTS

| | | | |
|---|---|---|---|
| 10,396,620 B2 | 8/2019 | Egami et al. | |
| 10,523,073 B2* | 12/2019 | Umesaki | H02K 1/16 |
| 2012/0133235 A1* | 5/2012 | Ogihara | H02K 3/12 |
| | | | 310/208 |
| 2012/0319522 A1* | 12/2012 | Ikeda | H02K 3/12 |
| | | | 310/201 |
| 2014/0183993 A1 | 7/2014 | Takasaki | |
| 2014/0300237 A1* | 10/2014 | Tokizawa | H02K 15/04 |
| | | | 310/201 |
| 2015/0222155 A1* | 8/2015 | Nakayama | B23K 9/167 |
| | | | 29/596 |
| 2017/0110929 A1 | 4/2017 | Egami et al. | |
| 2017/0237321 A1* | 8/2017 | Baba | H02K 3/12 |
| | | | 310/208 |
| 2018/0036836 A1* | 2/2018 | Nakamura | B23K 26/0604 |
| 2018/0248430 A1* | 8/2018 | Umesaki | H02K 3/12 |
| 2022/0263390 A1* | 8/2022 | Bapp | B23K 15/0053 |

OTHER PUBLICATIONS

An Office Action; "Notice of Reasons for Refusal," mailed by the Japanese Patent Office on Sep. 17, 2024, which corresponds to Japanese Patent Application No. 2021-063764 and is related to U.S. Appl. No. 17/704,338.

* cited by examiner

FIG. 14B

CONDUCTIVE WIRE, WELDING METHOD, AND METHOD FOR MANUFACTURING ROTATING ELECTRICAL MACHINE

CROSS-REFERENCE TO RELATED APPLICATIONS

The present patent application claims the priority of Japanese patent application No. 2021-063764 filed on Apr. 2, 2021, and the entire contents thereof are hereby incorporated by reference.

TECHNICAL FIELD

The present invention relates to a conductive wire, a welding method, and a method for manufacturing a rotating electrical machine.

BACKGROUND ART

A connection component described in Patent Literature 1 has been known as a conventional connection component that connects stator windings of a rotating electrical machine, which is mounted on, e.g., as an electric vehicle or a so-called hybrid vehicle and used as a drive source for travel and a generator, to a terminal block.

The connection component described in Patent Literature 1 has plural wire-shaped conductors that are connected to the windings at one end and to the terminal block at the other end, and these plural wire-shaped conductors are coupled to each other by a molded resin portion. One ends of the wire-shaped conductors are connected to the stator wirings by welding.

CITATION LIST

Patent Literature

Patent Literature 1: JP 2017-79528 A

SUMMARY OF THE INVENTION

A possible method for welding the one ends of the wire-shaped conductors to the stator windings is arc welding using an electric discharge in gas to weld metal conductors together. However, if the thickness of the windings is increased to increase the capacity of the rotating electrical machine and the thickness of the wire-shaped conductors is increased accordingly, heat generated by the electric discharge does not stay at a discharge point since it is diffused by thermal conduction through the windings or the wire-shaped conductors, and it takes a long time before the metal conductors start to melt. In addition, if discharge time is long, insulation layers such as enamel covering the metal conductors of the windings or of the wire-shaped conductors may be melted by heat.

Therefore, it is an object of the invention to provide a conductive wire, a welding method and a method for manufacturing a rotating electrical machine, which allow a metal conductor to rapidly melt during arc welding.

So as to achieve the above object, one aspect of the invention provides: a conductive wire, comprising:
an angled protrusion having a tapered shape being integrated with a wire-shaped main body and configured to generate an arc between itself and an arc welding electrode.

Further, so as to achieve the above object, another aspect of the invention provides: a welding method for welding a pair of conductive members by arc welding, wherein at least one of the pair of conductive members comprises an angled protrusion having a tapered shape, the method comprising:
melting the angled protrusion by generating an arc between the angled protrusion and an electrode, thereby welding the pair of conductive members.

Still further, so as to achieve the above object, still another aspect of the invention provides: a method for manufacturing a rotating electrical machine that comprises a rotor, a stator, a winding wound around the stator and a conductive wire welded to an end of the winding, the method comprising:
forming an angled protrusion having a tapered shape on the conductive wire so as to be integrated with a wire-shaped main body; and
melting the angled protrusion by generating an arc between the angled protrusion and an electrode in a state in which the main body is in contact with the end of the winding, thereby welding the conductive wire to the winding.

Effects of the Invention

A conductive wire, a welding method and a method for manufacturing a rotating electrical machine according to the present invention allow a metal conductor to rapidly melt during arc welding.

BEST MODE FOR CARRYING OUT THE INVENTION

First Embodiment

Figure 1:
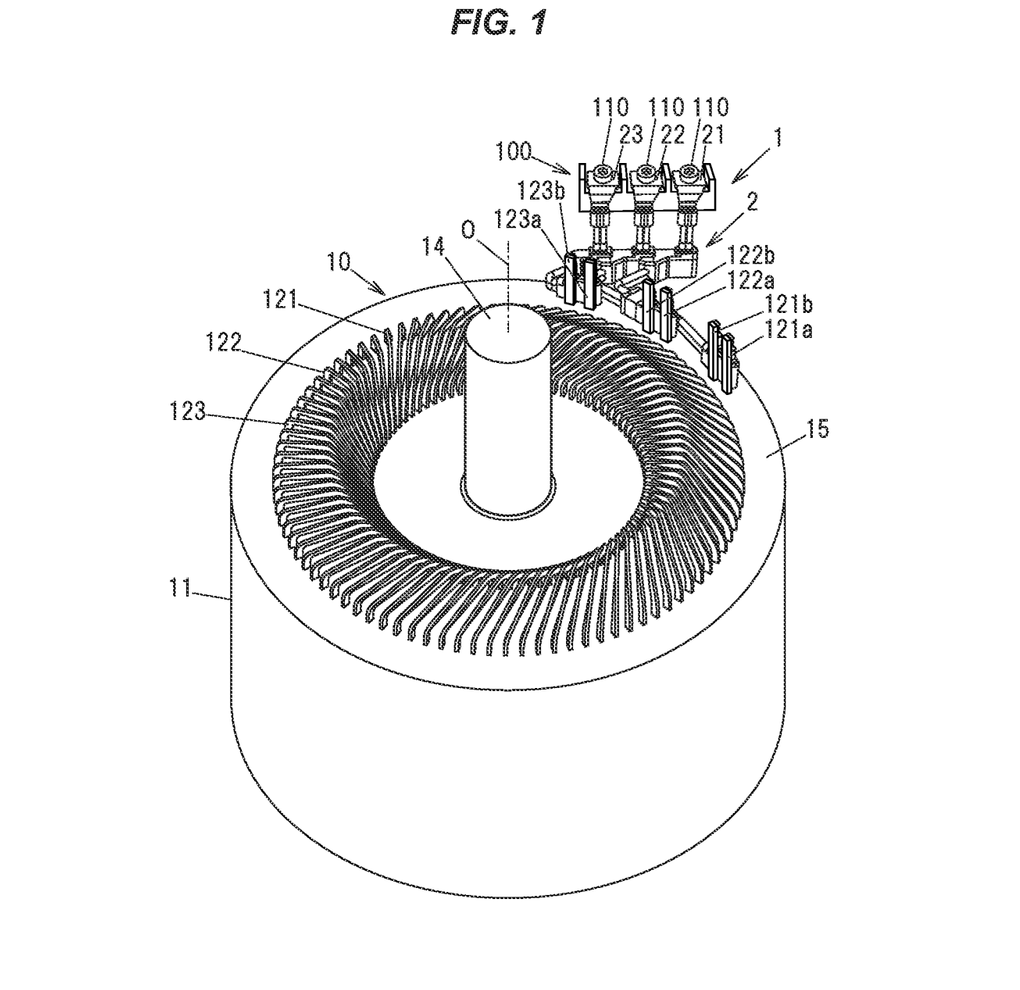
FIG. 1 is a perspective view showing a rotating electrical machine in the first embodiment of the present invention, together with a terminal block.
Figure 2A:
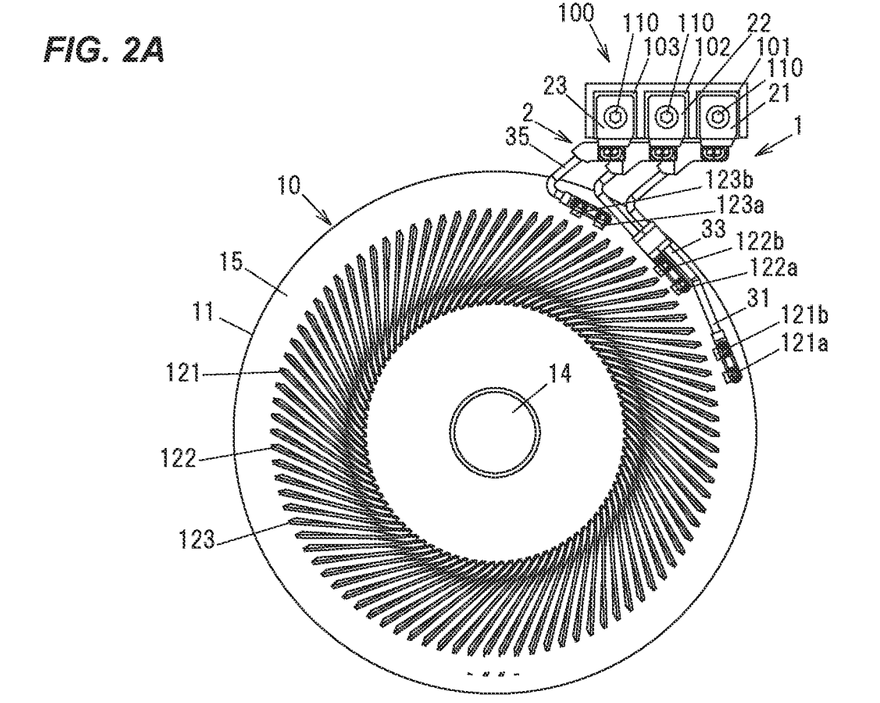
FIGS. 2A and 2B are configuration diagrams illustrating the rotating electrical machine and the terminal block when viewed in a rotation axis direction and when viewed from a side.
Figure 2B:
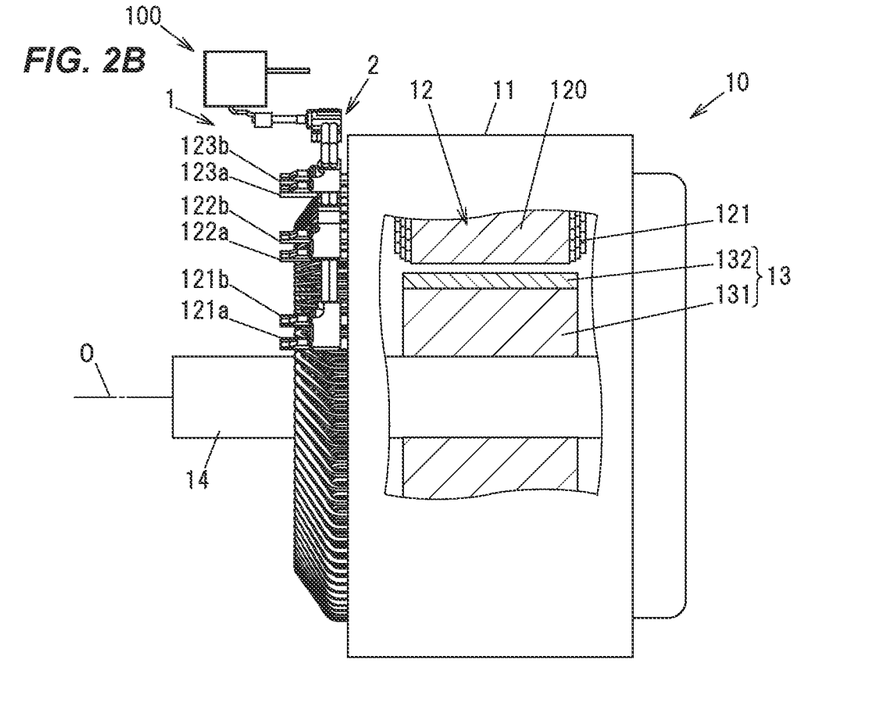

FIG. 1 is a perspective view showing a rotating electrical machine 1 in the first embodiment of the invention, together with a terminal block 100. FIGS. 2A and 2B are configuration diagrams illustrating the rotating electrical machine 1 and the terminal block 100 when viewed in a rotation axis direction and when viewed from a side. In FIG. 2B, the rotating electrical machine 1 is partially broken away to illustrate its internal structure.

The rotating electrical machine 1 is mounted on a vehicle as a drive source for travel and a generator and is connected to an inverter (not shown) via the terminal block 100. The rotating electrical machine 1 has a three-phase motor 10 and a connection component 2. Windings 121 to 123 (described later) of the three-phase motor 10 are electrically connected to first to third washers 101 to 103 of the terminal block 100 via the connection component 2.

The three-phase motor 10 has a motor case 11 having a bottomed cylindrical shape, a stator 12 housed in the motor case 11, a rotor 13 arranged on the inner side of the stator 12, a shaft 14 that passes through the center of the rotor 13 and is supported so as to be able to rotate integrally with the rotor 13, and a lid member 15 formed of a molding resin and covering an opening of the motor case 11.

The stator 12 is configured such that the U-, V- and W-phase windings 121 to 123 are wound on an annular stator core 120 that surrounds the rotor 13. In more particular, one of the U-, V- and W-phase windings 121 to 123 is wound around each of plural teeth provided on the stator core 120. The stator core 120 is made of a magnetic metal such as steel material. The windings 121 to 123 are rectangular insulated wires in which an insulation coating layer made of enamel is formed on an outer surface of a conductor made of copper. The windings 121 to 123 are molded into the lid member 15 so as to be partially exposed from the lid member 15 to the outside of the motor case 11.

The rotor 13 has a cylindrical rotor core 131 having a through-hole for insertion of the shaft 14, and a magnet 132 arranged around the rotor core 131. The magnet 132 has plural magnetic poles arranged so that S-poles and N-poles are located alternately. The shaft 14 is rotatably supported on the motor case 11 by a bearing (not shown) and rotates about a rotation axis O. Hereinafter, a direction parallel to the rotation axis O is referred to as an axial direction.

Figure 3:
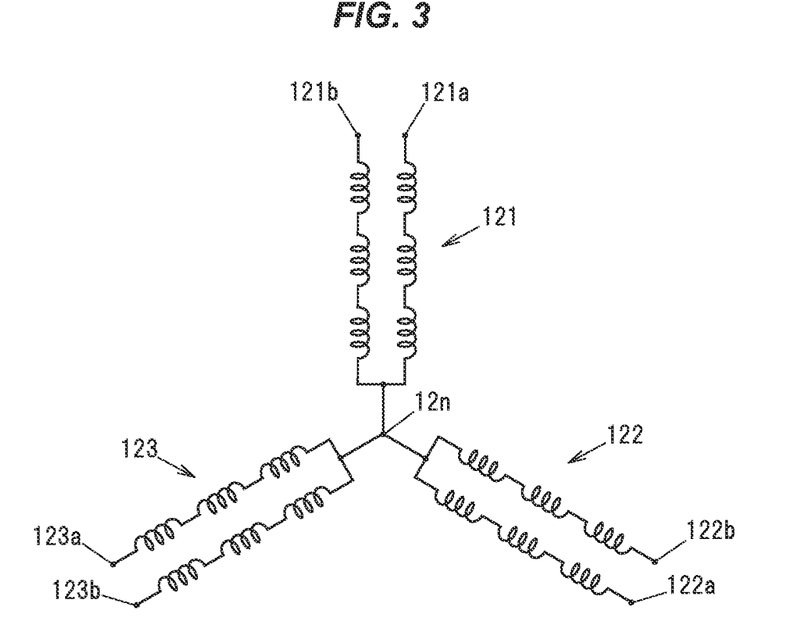
FIG. 3 is a circuit diagram illustrating an example configuration of an electrical circuit formed of windings in a three-phase motor.

FIG. 3 is a circuit diagram illustrating an example configuration of an electrical circuit formed of the windings 121 to 123 in the three-phase motor 10. Each of the U-phase winding 121, the V-phase winding 122 and the W-phase winding 123 is wound on the stator core 120 into coils at plural locations (six location in the example shown in FIG. 3) and its center portion is connected to a neutral point 12n. U-phase current is supplied to one end 121a and the other end 121b of the U-phase winding 121. V-phase current is supplied to one end 122a and the other end 122b of the V-phase winding 122. W-phase current is supplied to one end 123a and the other end 123b of the W-phase winding 123. The one ends 121a, 122a, 123a and the other ends 121b, 122b. 123b of the windings 121 to 123 for the respective phases protrude from the lid member 15 in the axial direction.

Figure 4A:
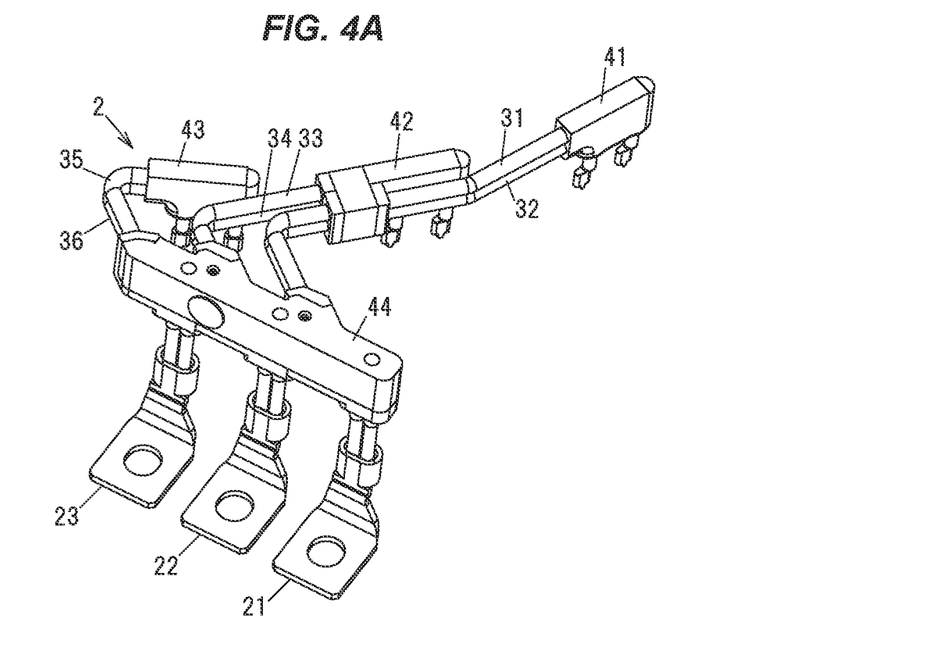
FIG. 4A is a perspective view showing a connection component.
Figure 4B:
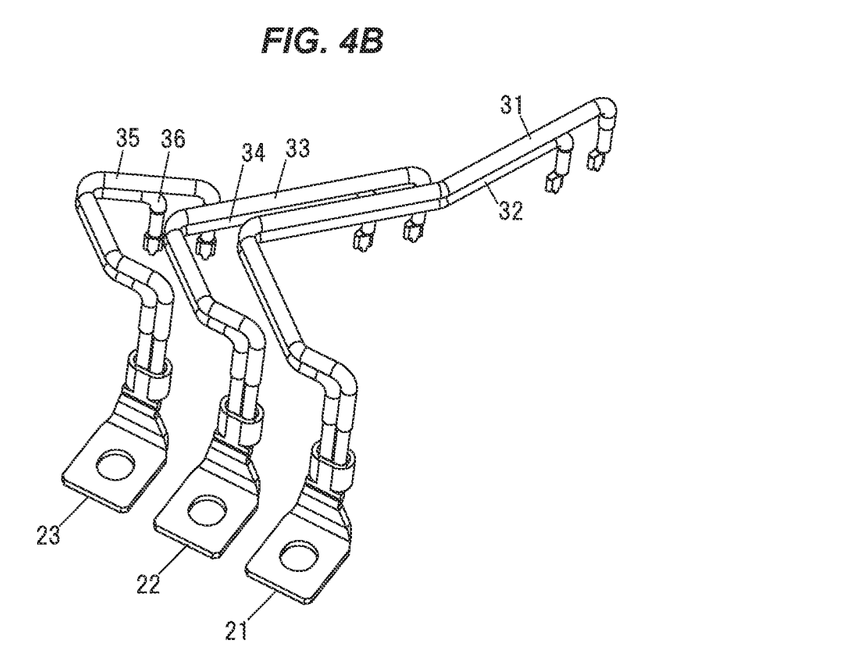
FIG. 4B is a perspective view in which illustration of first to third molded resin portions is omitted to show first to sixth conductive wires.

FIG. 4A is a perspective view showing the connection component 2. The connection component 2 includes first to third connection terminals 21 to 23 to be connected to the terminal block 100, first to sixth conductive wires 31 to 36, and first to fourth molded resin portions 41 to 44 formed of molded articles of a resin. FIG. 4B is a perspective view in which illustration of first to fourth molded resin portions 41 to 44 is omitted to show the first to sixth conductive wires 31 to 36.

The first conductive wire 31 is connected to the one end 121a of the U-phase winding 121 at one end and to the first connection terminal 21 at the other end. The second conductive wire 32 is connected to the other end 121b of the U-phase winding 121 at one end and to the first connection terminal 21 at the other end. The third conductive wire 33 is connected to the one end 122a of the V-phase winding 122 at one end and to the second connection terminal 22 at the other end. The fourth conductive wire 34 is connected to the other end 122b of the V-phase winding 122 at one end and to the second connection terminal 22 at the other end. The fifth conductive wire 35 is connected to the one end 123a of the W-phase winding 123 at one end and to the third connection terminal 23 at the other end. The sixth conductive wire 36 is connected to the other end 123b of the W-phase winding 123 at one end and to the third connection terminal 23 at the other end.

Connection of the one ends of the first and second conductive wires 31, 32 to the one and other ends 121a, 1.21b of the U-phase winding 121, connection of the one ends of the third and fourth conductive wires 33, 34 to the one and other ends 122a, 122b of the V-phase winding 122, and connection of the one ends of the fifth and sixth conductive wires 35, 36 to the one and other ends 123a, 123b of the W-phase winding 123 are made by arc welding using an electric discharge in gas. This welding method will be described later.

Connection of the other ends of the first and second conductive wires 31, 32 to the first connection terminal 21, connection of the other ends of the third and fourth conductive wires 33, 34 to the second connection terminal 22, and connection of the other ends of the fifth and sixth conductive wires 35, 36 to the third connection terminal 23 are made by crimping. Respectively using bolts 110, the first connection terminal 21 is connected to the first washer 101 of the terminal block 100, the second connection terminal 22 is connected to the second washer 102 of the terminal block 100, and the third connection terminal 23 is connected to the third washer 103 of the terminal block 100. The first to third washers 101 to 103 are connected to the inverter via wiring (not shown).

Figure 5A:
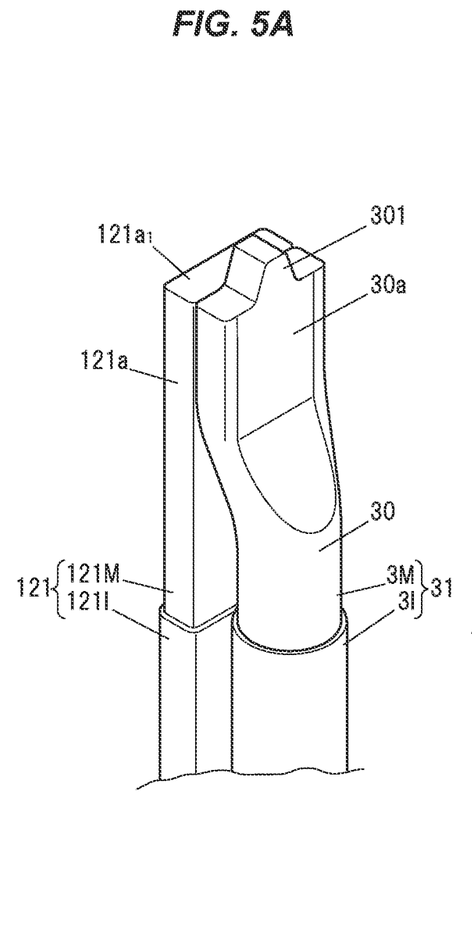
FIGS. 5A and 5B are perspective views showing one end of a U-shape winding and one end of the first conductive wire before and after welding.
Figure 5B:
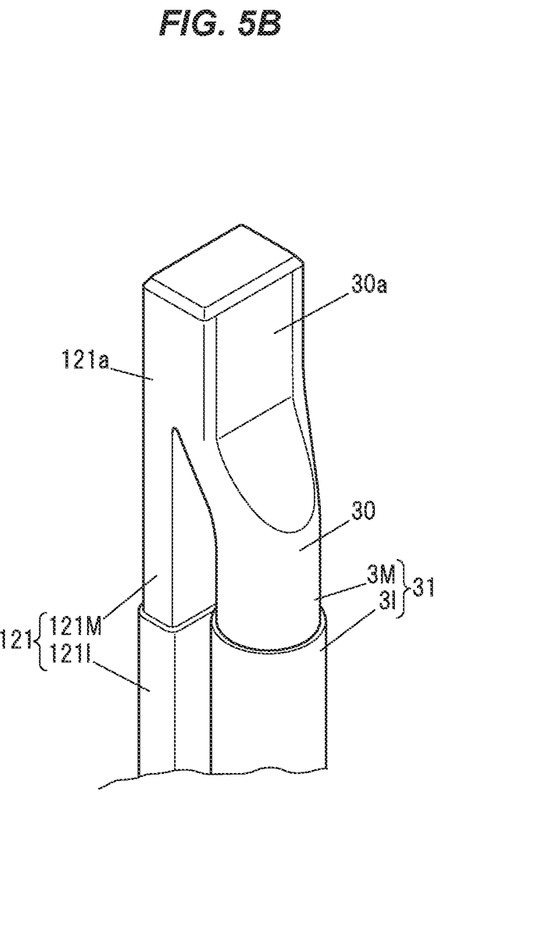
Figure 6A:
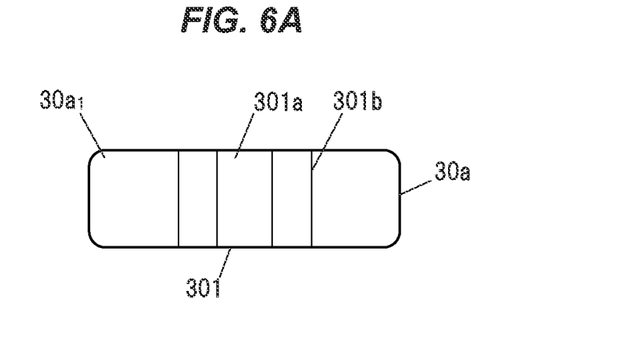
FIGS. 6A to 6C are an axial end view, a front view and a side view showing the one end of the first conductive wire.
Figure 6B:
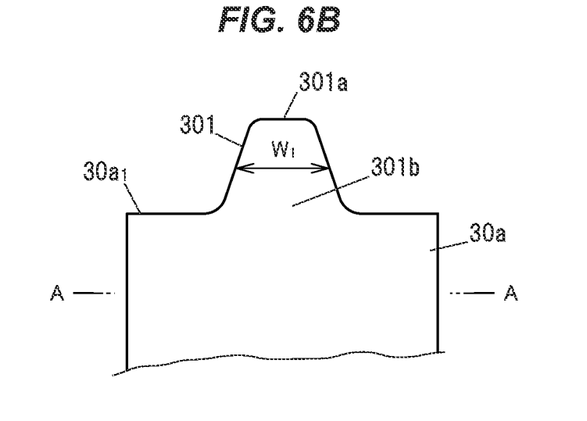
Figure 6C:
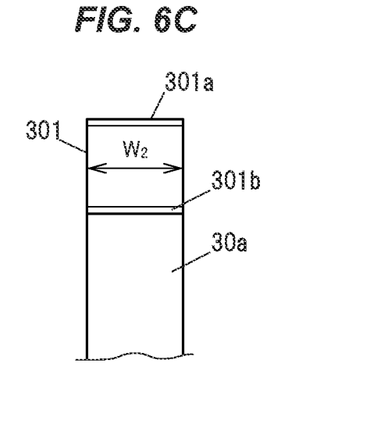
Figure 6D:
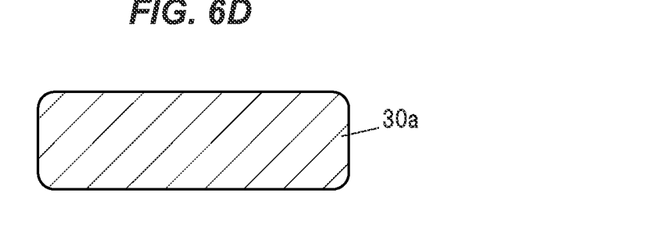
FIG. 6D is a cross-sectional view taken along line A-A of FIG. 6B.

FIGS. 5A and 5B are perspective views showing the one end 121a of the U-shape winding 121 and one end of the first conductive wire 31 before and after wielding. FIGS. 6A to 6C are an axial end view, a front view and a side view showing the one end of the first conductive wire 31. FIG. 6D is a cross-sectional view taken along line A-A of FIG. 6B. Although details are not shown in the figure, one ends of the second to sixth conductive wires 32 to 36 also have the same configuration as the one end of the first conductive wire 31 and are respectively welded to the one ends 122a, 123a and the other ends 121b, 122b. 123b of the windings 121 to 123.

The U-phase winding 121 is configured such that a conductor portion 121M made of a highly conductive metal such as copper is covered with an insulation layer 1211 made of an insulating material such as enamel, and the conductor portion 121M is exposed at the one end 121a by stripping the insulation layer 1211. The first conductive wire 31 is configured such that a conductor portion 3M integrally has a wire-shaped main body 30 and an angled protrusion 301 having a tapered shape and generating an arc between itself and an arc welding electrode (described later) and is covered with an insulation layer 31 except both ends. The conductor portion 3M is made of a highly conductive metal such as copper, and the insulation layer 31 is made of an insulating material such as enamel.

In the pre-welding state shown in FIG. 5A, an end 30a of the main body 30 to be connected to the U-phase winding 121 extends in the axial direction parallel to the one end 121a of the U-phase winding 121 and has a rectangular shape in a cross-section perpendicular to an extending direction thereof as shown in FIG. 6D. The end 30a of the main body 30 is exposed from the insulation layer 31 and is in contact with the conductor portion 121M of the U-phase winding 121.

The angled protrusion 301 protrudes from the end 30a of the main body 30 along the extending direction of the end 30a. In the first embodiment, the angled protrusion 301 has a trapezoidal shape, and a width $W_1$ in a direction of a long side of the cross section of the end 30a of the main body 30 (see FIG. 6B) decreases toward a tip portion 301a. The width of a base end portion 301b of the angled protrusion 301 in this direction is smaller than a width of the end 30a of the main body 30 in the direction of the long side, and the angled protrusion 301 protrudes perpendicularly from an axial end face $30a_1$ of the end 30a. In addition, the tip portion 301a of the angled protrusion 301 protrudes beyond an end face $121a_1$ of the one end 121a of the U-phase winding 121 in the axial direction. The end face $121a_1$ is a flat surface perpendicular to the axial direction.

In the first embodiment, a width $W_2$ of the angled protrusion 301 in a direction of a short side of the end 30a of the main body 30 (see FIG. 6C) is constant throughout from the base end portion 301b to the tip portion 301a.

Figure 7:
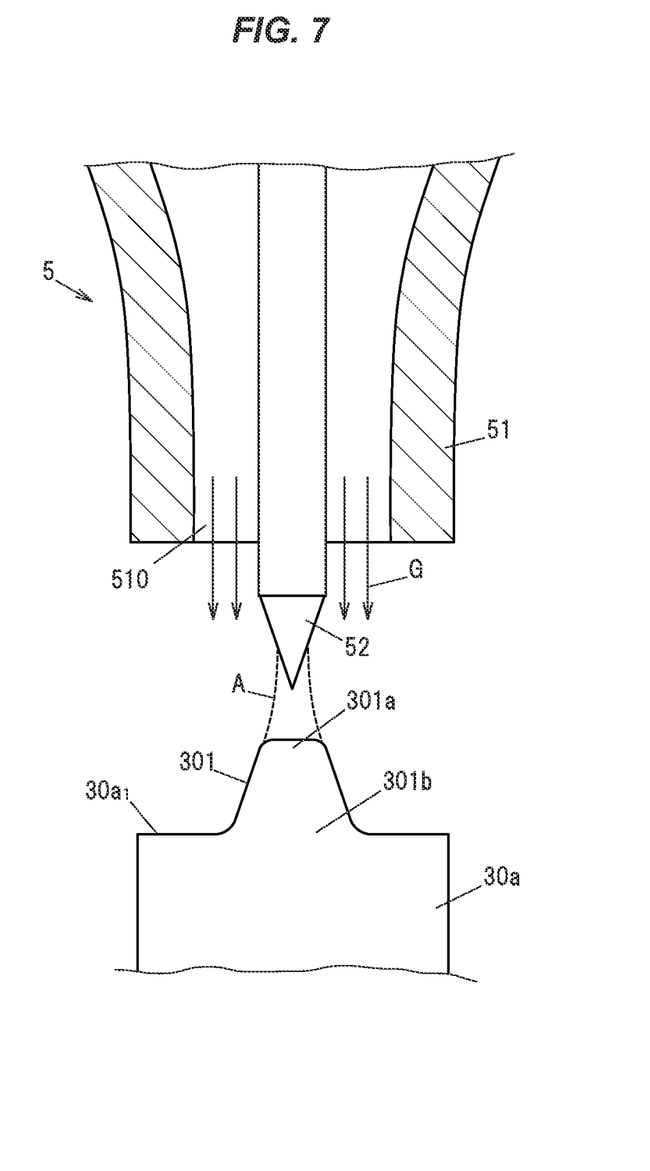
FIG. 7 is an explanatory diagram illustrating a welding process for welding the first conductive wire to the one end of the U-phase winding.

FIG. 7 is an explanatory diagram illustrating a welding process for welding the first conductive wire 31 to the one end 121a of the U-phase winding 121. This welding process is performed by arc welding, in more particular, JIG (Tungsten Inert Gas) welding using an electrode made of tungsten and an inert gas. A portion of a welding head 5 is shown in FIG. 7.

When performing TIC welding, the welding head 5 is positioned vertically above the angled protrusion 301 of the first conductive wire 31, The welding head 5 can be moved in an up-and-down direction by an actuator (not shown) and has a torch nozzle 51 to supply an inert gas G to a welding point, and a torch electrode 52 protruding downward from an opening 510 of the torch nozzle 51.

A method adopted in the first embodiment is a touch starting (i.e., lift arc starting) method in which energization is started by bringing the torch electrode 52 into contact with the tip portion 301a of the angled protrusion 301 and the welding head 5 is then moved upward, thereby generating arc discharge between the torch electrode 52 and the angled protrusion 301. The first conductive wire 31 is electrically grounded and serves as a cathode, while the torch electrode 52 serves as an anode. In FIG. 7, an arc A generated between the torch electrode 52 and the angled protrusion 301 is indicated by a broken line. The angled protrusion 301 is melted by heat of the arc A and flows down.

This arc discharge causes the conductor portion 3M to melt from the angled protrusion 301 and the end 30a of the main body 30 of the first conductive wire 31 is welded to the one end 121a of the U-phase winding 121 as shown in FIG. 5B. The welded area is then coated with an insulating material after cooling. TIG welding of the second to sixth conductive wires 32 to 36 may be performed at the same time as the first conductive wire 31, or TIG welding may be sequentially performed using one welding head 5.

(Functions and Effects of the First Embodiment)

In the first embodiment described above, since generation of the arc A is concentrated at the angled protrusion 301, the angled protrusion 301 melts rapidly. In addition, starting from the angled protrusion 301, a portion of the end 30a of the main body 30 also melts and the end 30a is rapidly welded to the one end 121a of the U-phase winding 121. This also suppresses melting of the insulation layers 31, 1211 due to thermal conduction.

In addition, since the arc A is generated in the state in which the tip portion 301a of the angled protrusion 301 is located closer to the torch electrode 52 than the end face $121a_1$ of the U-phase winding 121, the arc A is concentrated on the tip portion 301a of the angled protrusion 301 and the angled protrusion 301 melts more rapidly.

Although the example of providing the angled protrusion 301 on the first conductive wire 31 has been described in the first embodiment, a similar angled protrusion may be provided on the U-phase winding 121. In this case, the angled protrusion protrudes from the end face $121a_1$ of the one end 121a of the U-phase winding 121 in the axial direction. In addition, when the angled protrusion is provided on the U-phase winding 121, the angled protrusion 301 of the first conductive wire 31 may be omitted. That is, in the welding method of the first embodiment, the angled protrusion only needs to be provided on at least one of the pair of conductive members to be welded together. In the example described above, the conductor portion 3M of the first conductive wire 31 and the conductor portion 121M of the U-phase winding 121 correspond to the pair of conductive members.

Second Embodiment

Figure 8:
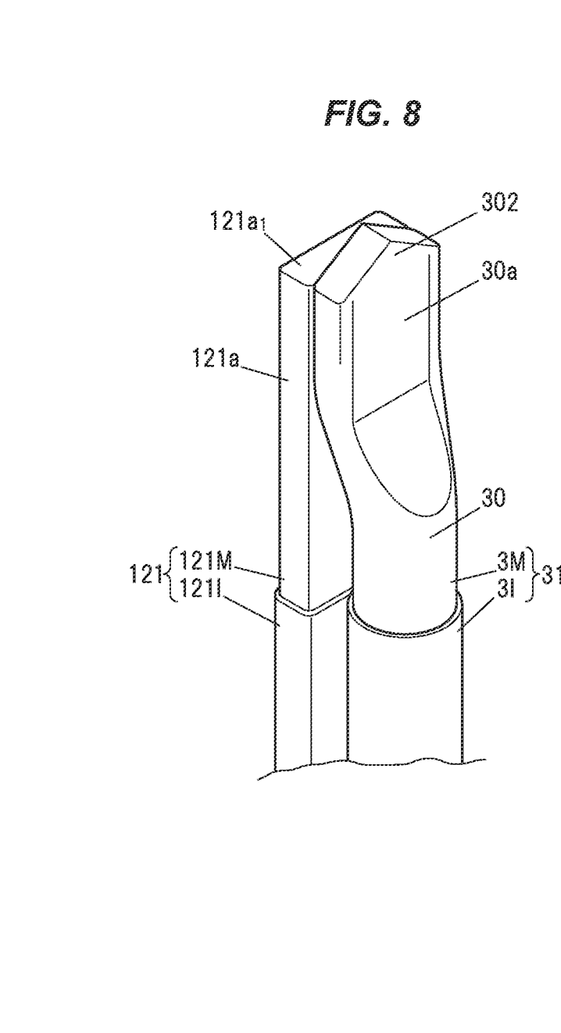
FIG. 8 is a perspective view showing the first conductive wire having an angled protrusion in the second embodiment and the one end of the U-phase winding.
Figure 9A:
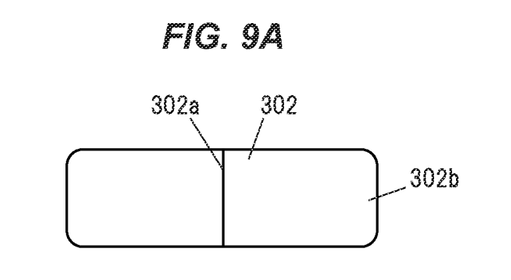
FIGS. 9A to 9C are an axial end view, a front view and a side view showing the one end of the first conductive wire in the second embodiment.
Figure 9B:
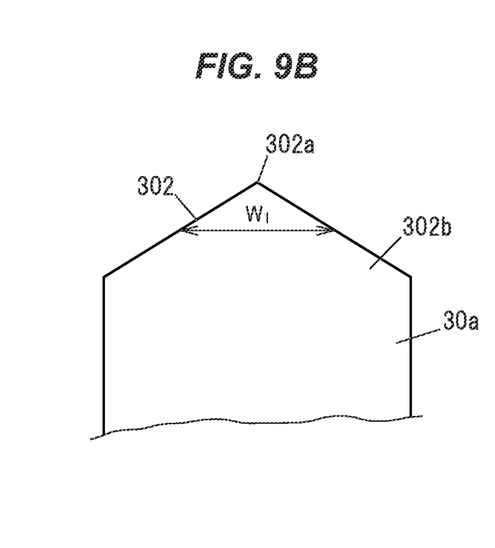
Figure 9C:
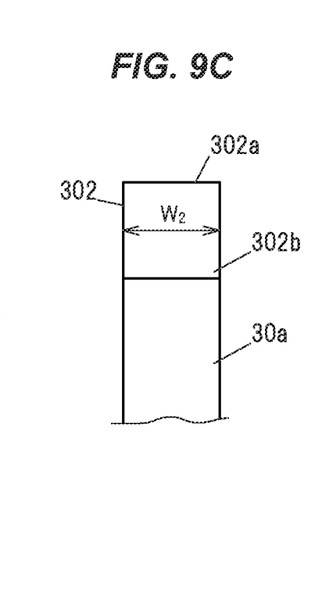

Next, the second embodiment of the invention will be described in reference to FIGS. 8 and 9. FIG. 8 is a perspective view showing the first conductive wire 31 having an angled protrusion 302 in the second embodiment and the one end 121a of the U-phase winding 121. FIGS. 9A to 9C are an axial end view, a front view and a side view showing the one end of the first conductive wire 31 in the second embodiment.

In the second embodiment, the shape of the angled protrusion 302 is different from the shape of the angled protrusion 301 in the first embodiment but other portions are the same as those in the first embodiment. Therefore, this difference will be mainly described. The other portions are denoted by the same reference signs as those in the first embodiment and the overlapping explanation will be omitted. The same applies to the third and fifth embodiments described later.

In the second embodiment, the angled protrusion 302 has a triangular shape and the width $W_1$ in the direction of the long side of the cross section of the end 30a of the main body 30 gradually decreases from a base end portion 302b to a tip portion 302a of the angled protrusion 302. The width $W_1$ of the base end portion 302b of the angled protrusion 302 is equal to the full width of the end 30a of the main body 30 in the direction of the long side. The width $W_2$ of the angled protrusion 302 in the direction of the short side of the end 30a of the main body 30 is constant throughout from the base end portion 302b to the tip portion 302a. The tip portion 302a of the angled protrusion 302 protrudes beyond the end face $121a_1$ of the one end 121a of the U-phase winding 121 in the axial direction. The first conductive wire 31 and the U-phase winding 121 are connected by TIG welding in the same manner as the first embodiment.

The same functions and effects as those in the first embodiment are also obtained in the second embodiment.

Third Embodiment

Figure 10:
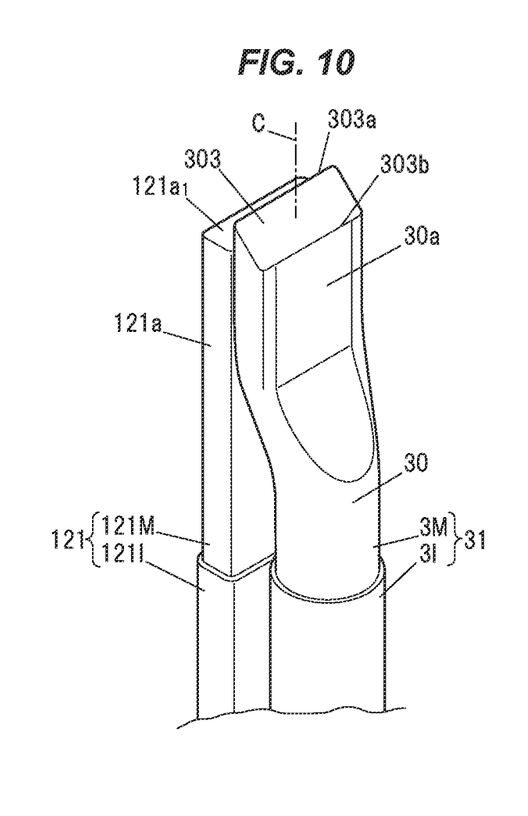
FIG. 10 is a perspective view showing the first conductive wire having an angled protrusion in the third embodiment and the one end of the U-phase winding.
Figure 11A:
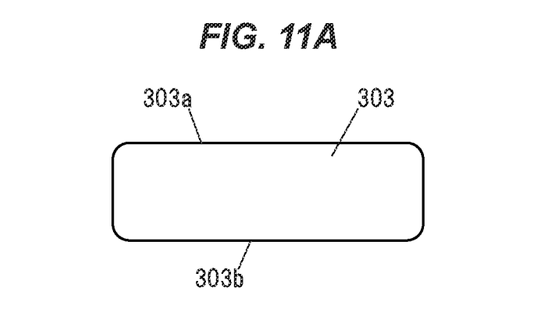
FIGS. 11A to 11C are an axial end view, a front view and a side view showing the one end of the first conductive wire in the third embodiment.
Figure 11B:
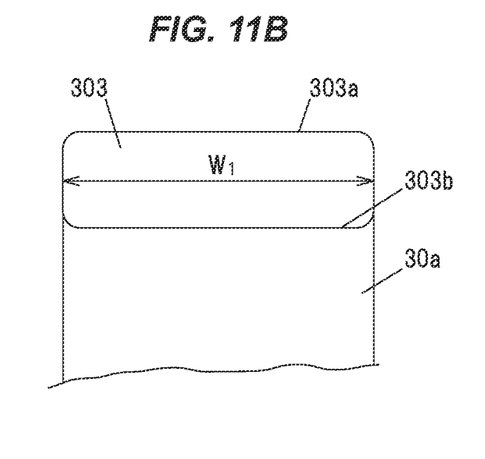
Figure 11C:
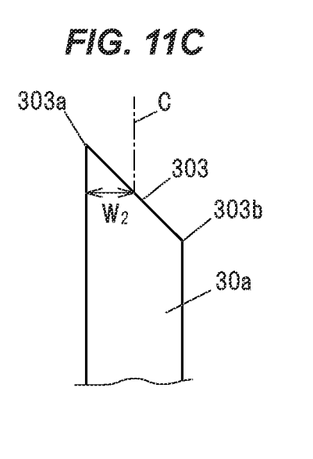

Next, the third embodiment of the invention will be described in reference to FIGS. 10 and 11. FIG. 10 is a perspective view showing the first conductive wire 31 having an angled protrusion 303 in the third embodiment and the one end 121a of the U-phase winding 121. FIGS. 11A to 11C are an axial end view, a front view and a side view showing the one end of the first conductive wire 31 in the third embodiment. In FIGS. 10 and 11C, a central axis C of the end 30a of the main body 30 is indicated by a dash-dot line.

The shape of the angled protrusion 303 in the third embodiment is a triangular shape in which the width $W_2$ in the direction of the short side of the end 30a of the main body 30 gradually decreases from a base end portion 303b to a tip portion 303a. The tip portion 303a of the angled protrusion 303 is located on one side in the direction of the short side, which is on the U-phase winding 121 side, relative to the central axis C. The width $W_1$ of the angled protrusion 303 in the direction of the long side of the end 30a of the main body 30 is constant. The tip portion 303a of the angled protrusion 303 protrudes beyond the end face $121a_1$ of the U-phase winding 121 in the axial direction. The first conductive wire 31 and the U-phase winding 121 are connected by TIG welding in the same manner as the first embodiment.

The same functions and effects as those in the first embodiment are also obtained in the third embodiment. In addition, since the tip portion 303a of the angled protrusion 303 is located on the U-phase winding 121 side relative to the central axis C, the molten angled protrusion 303 easily flows to the side where the end face $121a_1$ of the U-phase winding 121 is located.

Fourth Embodiment

Figure 12:
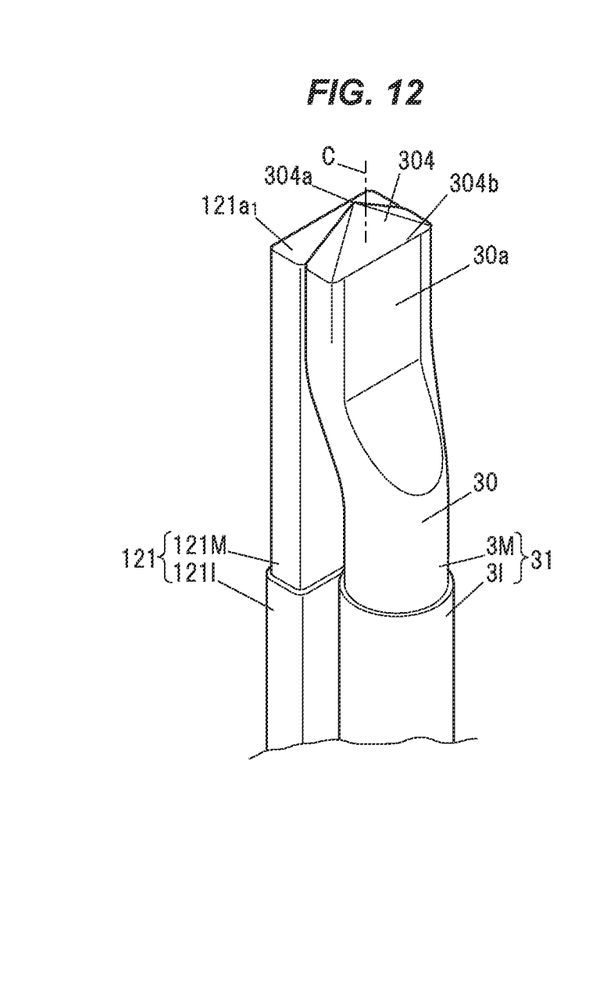
FIG. 12 is a perspective view showing the first conductive wire having an angled protrusion in the fourth embodiment and the one end of the U-phase winding.
Figure 13A:
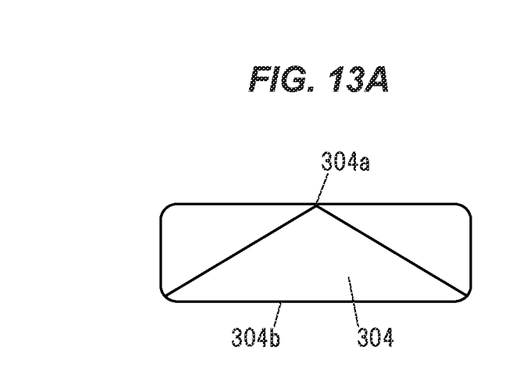
FIGS. 13A to 13C are an axial end view, a front view and a side view showing the one end of the first conductive wire in the fourth embodiment.
Figure 13B:
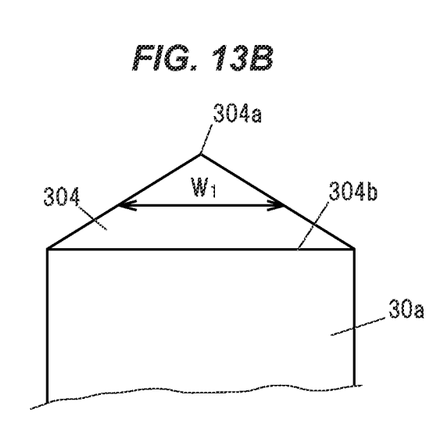
Figure 13C:
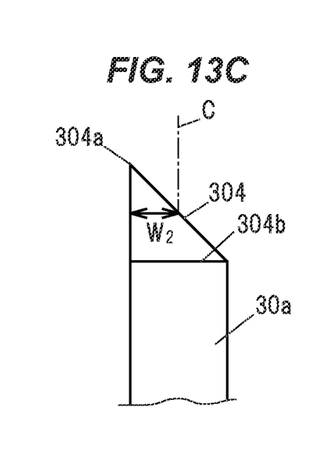

Next, the fourth embodiment of the invention will be described in reference to FIGS. 12 and 13. FIG. 12 is a perspective view showing the first conductive wire 31 having an angled protrusion 304 in the fourth embodiment and the one end 121a of the U-phase winding 121. FIGS. 13A to 13C are an axial end view, a front view and a side view showing the one end of the first conductive wire 31 in the fourth embodiment. In FIGS. 12 and 13C, the central axis C of the end 30a of the main body 30 is indicated by a dash-dot line.

The shape of the angled protrusion 304 in the fourth embodiment is a polygonal pyramid shape in which the width $W_2$ in the direction of the short side of the end 30a of the main body 30 and the width $W_1$ in the direction of the long side gradually decreases from a base end portion 304b to a tip portion 304a. The tip portion 304a of the angled protrusion 304 is located on one side in the direction of the short side, which is on the U-phase winding 121 side, relative to the central axis C. The tip portion 304a of the angled protrusion 304 protrudes beyond the end face $121aa$ of the one end 121a of the U-phase winding 121 in the axial direction. The first conductive wire 31 and the U-phase winding 121 are connected by TIG welding in the same manner as the first embodiment.

The same functions and effects as those in the first embodiment are also obtained in the fourth embodiment, and in addition, since the tip portion 304a of the angled protrusion 304 is located on the U-phase winding 121 side relative to the central axis C, the molten angled protrusion 304 easily flows to the side where the end face $121a_1$ of the U-phase winding 121 is located. Furthermore, since the tip portion 304a of the angled protrusion 304 has a pointed apex (e.g., in a needle shape), the arc of TIG welding is more likely to be concentrated at the tip portion 304a.

Fifth Embodiment

Next, the fifth embodiment of the invention will be described in reference to FIG. 14. FIGS. 14A and 14B are perspective views showing the one end 121a of the U-shape winding 121 and the one end of the first conductive wire 31 in the fifth embodiment before and after welding.

In the fifth embodiment, the angled protrusion 301 protrudes in a direction intersecting with the extending direction of the main body 30. The main body 30 is configured such that the end 30a to be connected to the U-shape winding 121 is bent along the circumferential direction of the stator 12 and the angled protrusion 301 is integrally provided on the end 30a, The angled protrusion 301 protrudes along the axial direction of the stator 12 in a direction intersecting with the extending direction of the end 30a (the circumferential direction of the stator 12).

The end 30a has a rectangular shape in a cross-section perpendicular to the extending direction thereof, and the angled protrusion 301 protrudes from an end in the direction of the long side of this cross section. The tip portion 301a of the angled protrusion 301 protrudes beyond the end face $121a_1$ of the one end 121a of the U-phase winding 121 in the axial direction.

Melting of the conductor portion 3M due to arc discharge starts from the angled protrusion 301, and the end 30a of the main body 30 of the first conductive wire 31 is welded to the one end 121a of the U-phase winding 121 as shown in FIG. 1.4B.

Figure 14A:
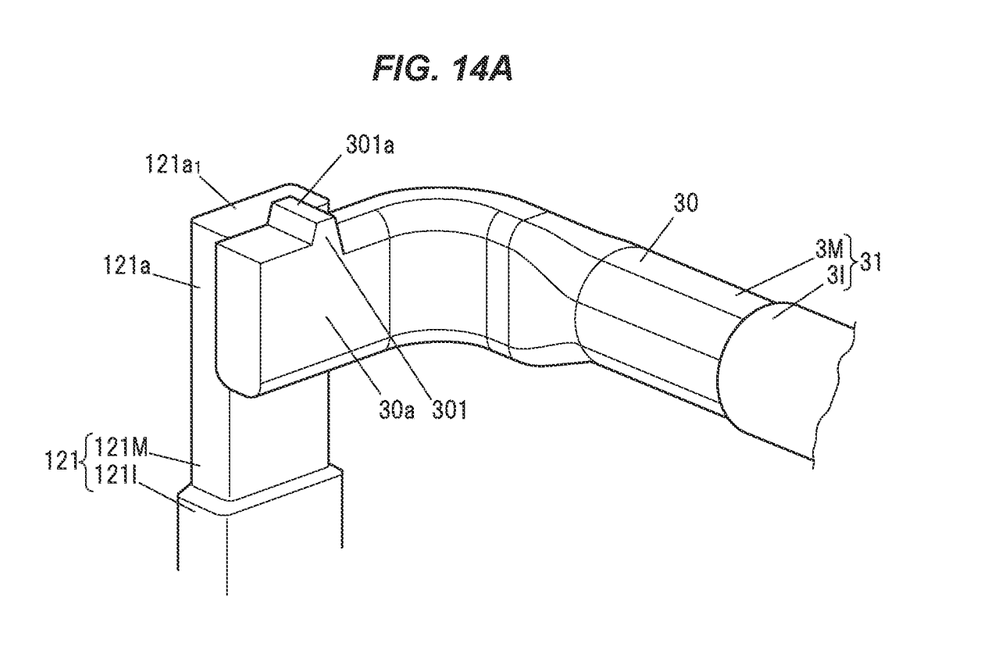
FIGS. 14A and 14B are perspective views showing the one end of the U-shape winding and the one end of the first conductive wire before and after welding.
Figure 14B:
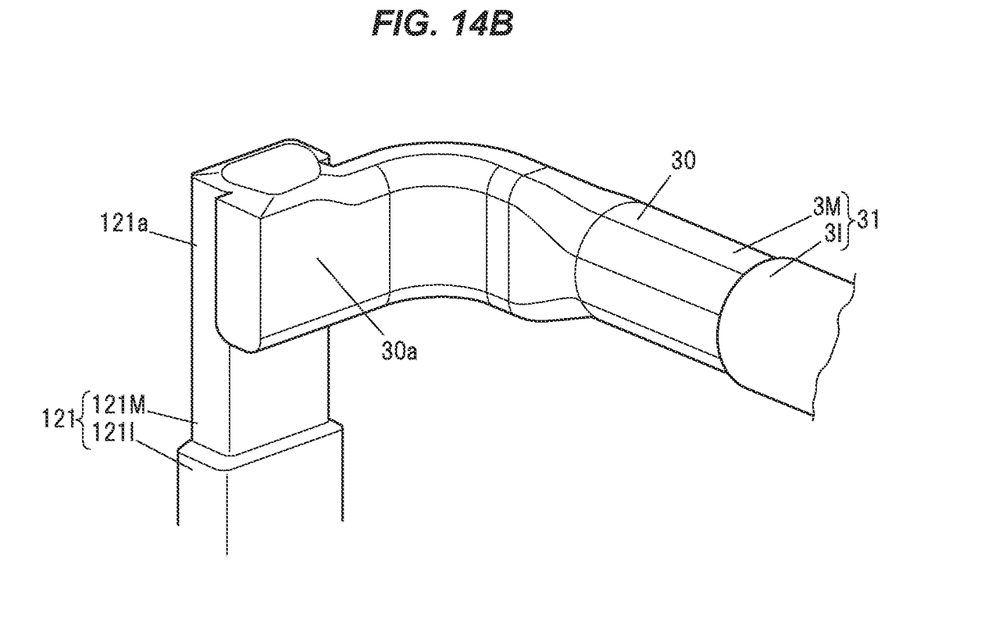

The same functions and effects as those in the first embodiment are also obtained in the fifth embodiment, Although FIG. 14A shows the example in which the angled protrusion 301 is formed in a shape similar to the angled protrusion 301 in the first embodiment, it may be formed in a shape similar to the angled protrusions 302-304 in the second to fourth embodiment.

SUMMARY OF THE EMBODIMENTS

Technical ideas understood from the embodiments will be described below citing the reference signs, etc., used for the embodiments. However, each reference sign described below is not intended to limit the constituent elements of the claims to the members, etc., specifically described in the embodiments.

[1] A conductive wire (31 to 36) comprising: an angled protrusion (301 to 304) having a tapered shape being integrated with a wire-shaped main body (30) and configured to generate an arc (A) between itself and an arc welding electrode (52).

[2] The conductive wire (31 to 36) defined by [1], wherein the angled protrusion (301 to 304) protrudes from an end (30a) of the main body (30) along an extending direction of the end (30a).

[3] The conductive wire (31 to 36) defined by [2], wherein the end (30a) of the main body (30) has a rectangular shape in a cross-section perpendicular to the extending direction, and wherein a width ($W_1$) of the angled protrusion (301, 302) in a direction of a long side of the cross-section decreases toward a tip portion.

[4] The conductive wire (31 to 36) defined by [2] or [3], wherein the end (30a) of the main body (30) has a rectangular shape in a cross-section perpendicular to the extending direction, and wherein a width ($W_2$) of the angled protrusion (303, 304) in a direction of a short side of the cross-section decreases toward a tip portion (303a, 304a).

[5] The conductive wire (31 to 36) defined by [4], wherein a tip portion (303a, 304a) of the angled protrusion (303, 304) is located on one side in the direction of the short side relative to a central axis (C) of the end.

[6] The conductive wire (31 to 36) defined by [1], wherein the angled protrusion (301) protrudes in a direction intersecting with an extending direction of the main body (30).

[7] The conductive wire (31 to 36) defined by [6], wherein the angled protrusion (301) is integrally provided on an end (30a) of the main body (30), wherein the end (30a) has a rectangular shape in a cross-section perpendicular to the extending direction thereof, and wherein the angled protrusion (301) protrudes from an end in the direction of the long side of the cross-section.

[8] A welding method for welding a pair of conductive members (3M, 121M) by arc welding, wherein at least one (3M) of the pair of conductive members (3M, 121M) comprises an angled protrusion (301 to 304) having a tapered shape, the method comprising: melting the angled protrusion (301 to 304) by generating an arc (A) between the angled protrusion (301 to 304) and an electrode (the torch electrode 52), thereby welding the pair of conductive members (3M, 121M).

[9] The method defined by [8], wherein the angled protrusion (301 to 304) is provided on one (3M) of the pair of conductive members (3M, 121M), and wherein, during the welding, the arc (A) is generated in a state in which a tip portion (301a, 302a, 303a, 304a) of the angled protrusion (301 to 304) is located closer to the electrode (52) than an end (121a) of the other conductive member (121M).

[10] A method for manufacturing a rotating electrical machine (1) that comprises a rotor (13), a stator (12), a winding (121 to 123) wound around the stator (12) and a conductive wire (31 to 36) welded to an end (121a, 121b, 122a, 122b, 123a, 123b) of the winding (121 to 123), the method comprising: forming an angled protrusion (301 to 304) having a tapered shape on the conductive wire (31 to 36) so as to be integrated with a wire-shaped main body (30) and melting the angled protrusion (301 to 304) by generating an arc (A) between the angled protrusion (301 to 304) and an electrode (52) in a state in which the main body (30) is in contact with the end (121a, 121b, 122a, 122b, 123a, 123b) of the winding (121 to 123), thereby welding the conductive wire (31 to 36) to the winding (121 to 123).

Although the embodiments of the invention have been described, the invention according to claims is not to be limited to the embodiments described above. Further, please note that not all combinations of the features described in the embodiments are necessary to solve the problem of the invention.

In addition, the invention can be appropriately modified and implemented without departing from the gist thereof. For example, although the first to sixth conductive wires 31 to 36 assembled to the three-phase motor 10 have been described in the embodiments, it is not limited thereto and the invention can be applied to conductive wires used in various applications. In addition, the welding method of the invention is not limited to welding of a conductive wire to a winding and can be used in various applications in which a pair of conductive members are arc-welded.

The invention claimed is:

1. A welding method for welding a pair of conductive members by arc welding, wherein one of the pair of conductive members comprises a main body and an angled protrusion having a tapered shape formed at the end of the main body, the method comprising:
performing welding by positioning a torch electrode vertically above the angled protrusion of the one of the pair of conductive members;
melting the angled protrusion by generating an arc between the angled protrusion and the torch electrode in a state in which the angled protrusion is located closer to the torch electrode than an end of another of the pair of conductive members, and
after melting the angled protrusion, starting from the angled protrusion, melting a portion of the main body connected to the angled protrusion of the one of the pair of conductive members, thereby welding the pair of conductive members.

2. A method for manufacturing a rotating electrical machine that comprises a rotor, a stator, a winding wound around the stator and a conductive wire welded to an end of the winding, the method comprising:
forming an angled protrusion having a tapered shape on the conductive wire having a wire-shaped main body;
performing welding of a pair of conductive wires by positioning a torch electrode vertically above the angled protrusion of the one of the pair of conductive wires;
melting the angled protrusion by generating an arc between the angled protrusion and the torch electrode in a state in which the main body is in contact with the end of the winding and the angled protrusion of the conductive wire is located closer to the torch electrode than an end of the winding, and
after melting the angled protrusion, starting from the angled protrusion, melting a portion of the end of the main body of the conductive wire, thereby welding the conductive wire to the winding.

3. The welding method of claim 1, wherein the angled protrusion has a tip portion at the end of the tapered shape that is integrated with a wire-shaped main body and configured to generate an arc between itself and an arc welding electrode.

4. The welding method of claim 1, wherein the angled protrusion protrudes from an end of the main body along an extending direction of the conductive member end.

5. The welding method of claim 4, wherein the end of the main body has a rectangular shape in a cross-section perpendicular to the extending direction, and wherein a width of the angled protrusion in a direction of a long side of the cross-section decreases toward a tip portion.

6. The welding method of claim 4, wherein the end of the main body has a rectangular shape in a cross-section perpendicular to the extending direction, and wherein a width of the angled protrusion in a direction of a short side of the cross-section decreases toward a tip portion.

7. The welding method of claim 6, wherein the tip portion of the angled protrusion is located on one side in the direction of the short side relative to a central axis of the end.

8. The welding method of claim 1, wherein the angled protrusion protrudes in a direction intersecting with an extending direction of the main body.

9. The conductive wire according to claim 5, wherein the angled protrusion is integrally provided on an end of the main body, wherein the end has a rectangular shape in a cross-section perpendicular to the extending direction thereof, and wherein the angled protrusion protrudes from an end in the direction of the long side of the cross-section.

\* \* \* \* \*